United States Patent
Saha et al.

(10) Patent No.: US 7,870,177 B2
(45) Date of Patent: Jan. 11, 2011

(54) METHOD AND SYSTEM FOR MULTI-PROCESSOR FFT/IFFT WITH MINIMUM INTER-PROCESSOR DATA COMMUNICATION

(75) Inventors: Kaushik Saha, Delhi (IN); Srijib Narayan, West Bengal (IN)

(73) Assignee: STMicroelectronics Pvt. Ltd., Noida, Uttar Pradesh (IN)

( * ) Notice: Subject to any disclaimer, the term of this patent is extended or adjusted under 35 U.S.C. 154(b) by 990 days.

(21) Appl. No.: 10/781,336

(22) Filed: Feb. 17, 2004

(65) Prior Publication Data

US 2004/0236809 A1 Nov. 25, 2004

(30) Foreign Application Priority Data

Feb. 17, 2003 (IN) .............................. 127/DEL/03

(51) Int. Cl.
*G06F 15/00* (2006.01)
(52) U.S. Cl. ..................................................... 708/404
(58) Field of Classification Search .......... 708/400–409
See application file for complete search history.

(56) References Cited

U.S. PATENT DOCUMENTS

| | | | |
|---|---|---|---|
| 4,547,862 | A | 10/1985 | McIver et al. |
| 5,093,801 | A | 3/1992 | White et al. |
| 5,293,330 | A | 3/1994 | Sayegh |
| 5,303,172 | A | 4/1994 | Magar et al. |
| 5,313,413 | A | 5/1994 | Bhatia et al. |
| 5,473,556 | A | 12/1995 | Aguilar et al. |
| 5,831,883 | A | 11/1998 | Suter et al. |
| 5,991,787 | A | 11/1999 | Abel et al. |

(Continued)

FOREIGN PATENT DOCUMENTS

EP 1426872 A2 6/2004

(Continued)

OTHER PUBLICATIONS

Toshihiro et al., Radix R Parallel FFT algorithms with a global interconnection networks and its Evaluation, 1997, IEEE, pp. 424-428.*

(Continued)

*Primary Examiner*—Chat C Do
(74) *Attorney, Agent, or Firm*—Lisa K. Jorgenson; Paul F. Rusyn; Graybeal Jackson LLP

(57) ABSTRACT

The embodiments of the present invention provide a scalable method for implementing FFT/IFFT computations in multi-processor architectures that provides improved throughput by eliminating the need for inter-processor communication after the computation of the first "$\log_2 P$" stages for an implementation using "P" processing elements, comprising computing each butterfly of the first "$\log_2 P$" stages on either a single processor or each of the "P" processors simultaneously and distributing the computation of the butterflies in all the subsequent stages among the "P" processors such that each chain of cascaded butterflies consisting of those butterflies that have inputs and outputs connected together, are processed by the same processor. The embodiments of the invention also provide a system for obtaining scalable implementation of FFT/IFFT computations in multiprocessor architectures that provides improved throughput by eliminating the need for inter-processor communication after the computation of the first "$\log_2 P$" stages for an implementation using "P" processing elements.

18 Claims, 4 Drawing Sheets

U.S. PATENT DOCUMENTS

| | | | |
|---|---|---|---|
| 6,061,705 A | 5/2000 | Hellberg | |
| 6,247,034 B1 | 6/2001 | Nakai et al. | |
| 6,304,887 B1 | 10/2001 | Ju et al. | |
| 6,366,936 B1 | 4/2002 | Lee et al. | |
| 6,618,800 B1 * | 9/2003 | Weiss et al. | 712/13 |
| 6,751,643 B2 * | 6/2004 | Jaber | 708/409 |
| 6,792,441 B2 * | 9/2004 | Jaber | 708/403 |
| 6,839,727 B2 | 1/2005 | Kechriotis | |
| 6,907,439 B1 * | 6/2005 | Wicker | 708/404 |
| 6,996,595 B2 | 2/2006 | LaRocca et al. | |
| 7,164,723 B2 | 1/2007 | Sunwoo | |
| 7,409,418 B2 | 8/2008 | Saha et al. | |
| 7,489,742 B2 | 2/2009 | Saha et al. | |
| 2001/0051967 A1 | 12/2001 | Jaber | |
| 2002/0184279 A1 * | 12/2002 | Kechriotis | 708/400 |
| 2003/0041080 A1 | 2/2003 | Jaber | |
| 2004/0167950 A1 | 8/2004 | Saha et al. | |
| 2005/0138098 A1 | 6/2005 | Saha et al. | |
| 2006/0072674 A1 | 4/2006 | Saha et al. | |
| 2009/0103622 A1 | 4/2009 | Tripathi et al. | |
| 2009/0154558 A1 | 6/2009 | Agarwal et al. | |
| 2009/0209989 A1 | 8/2009 | Blake et al. | |
| 2009/0265739 A1 | 10/2009 | Arora et al. | |

FOREIGN PATENT DOCUMENTS

| | | |
|---|---|---|
| EP | 1447752 A2 | 8/2004 |
| EP | 1426872 A3 | 2/2006 |
| EP | 1447752 A3 | 2/2006 |
| IN | 1208/DEL/2002 | 12/2002 |
| WO | 0169424 A2 | 9/2001 |

OTHER PUBLICATIONS

Douglas et al., A Bus-Oriented Multiprocessor Fast Fourier Transform, 1991, IEEE, pp. 2547-2552.*

Laxmi et al., Performance Analysis of FFT Algorithms on Multiprocessor Systems, 1983, IEEE, pp. 512-521.*

European Search Report, European Application No. EP 04 10 0617, Dated Dec. 23, 2005, 3 Pages.

Piedra (1994) "Paraellel 1-D FFT Implementation With TMS320C4X DSPS"; Texas Instruments, Application Report SPRA108, XP002360704, HTTP://FOCUS.TI.COM/LIT/AN/SPRA108/SPRA108.PDF.

Chu et al. (2000) "Inside the FFT Black Box: Serial and Parallel Fast Fourier Transform Algorithms"; CRC Press; pp. 69-79, 177-182, 209-210, 226-227.

Dawoud (2002) "An Effective Memory Addressing Scheme for Multiprocessor FFT System"; 2002 6th IEEE Africon Conference, Univ. of Pretoria, George., South Africa; 1:29-34.

European Search Report Dated Dec. 23, 2005, for European Patent Publication No. EP1426872 A3 Published Feb. 22, 2006.

* cited by examiner

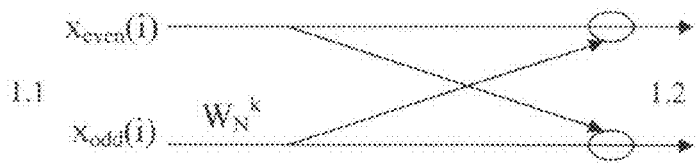
Figure 1: Butterfly, the basic computational block of FFT/IFFT (--Prior Art--)
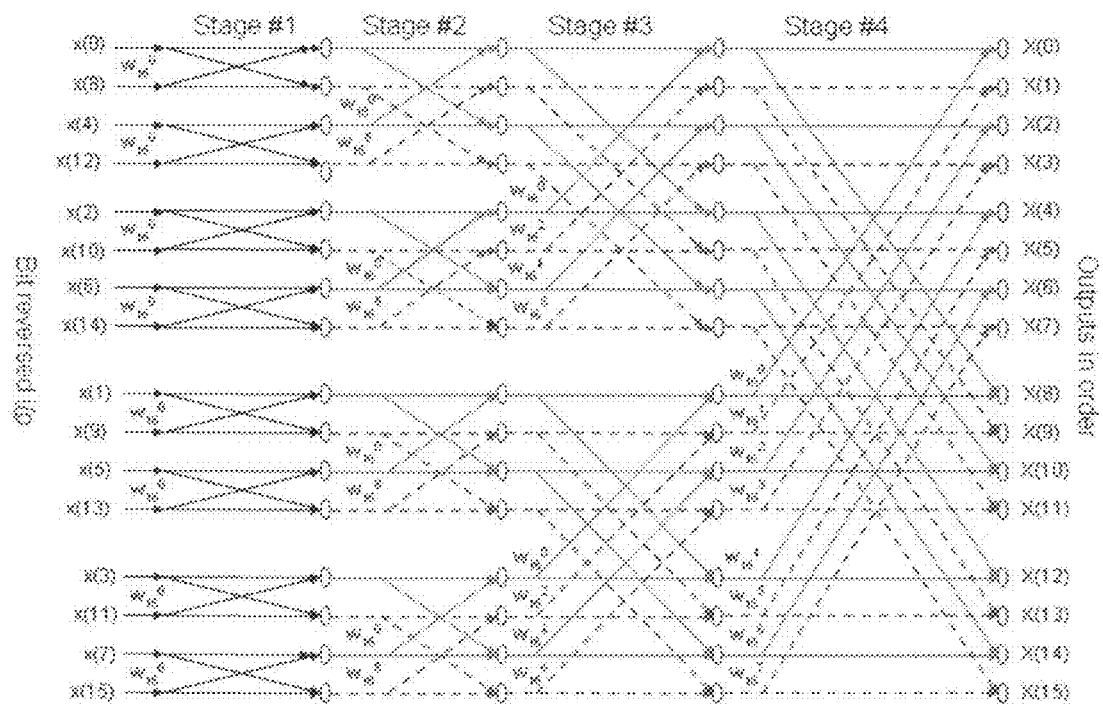
Figure 2. Butterfly distribution for 2-processor configuration, N=16, P=2

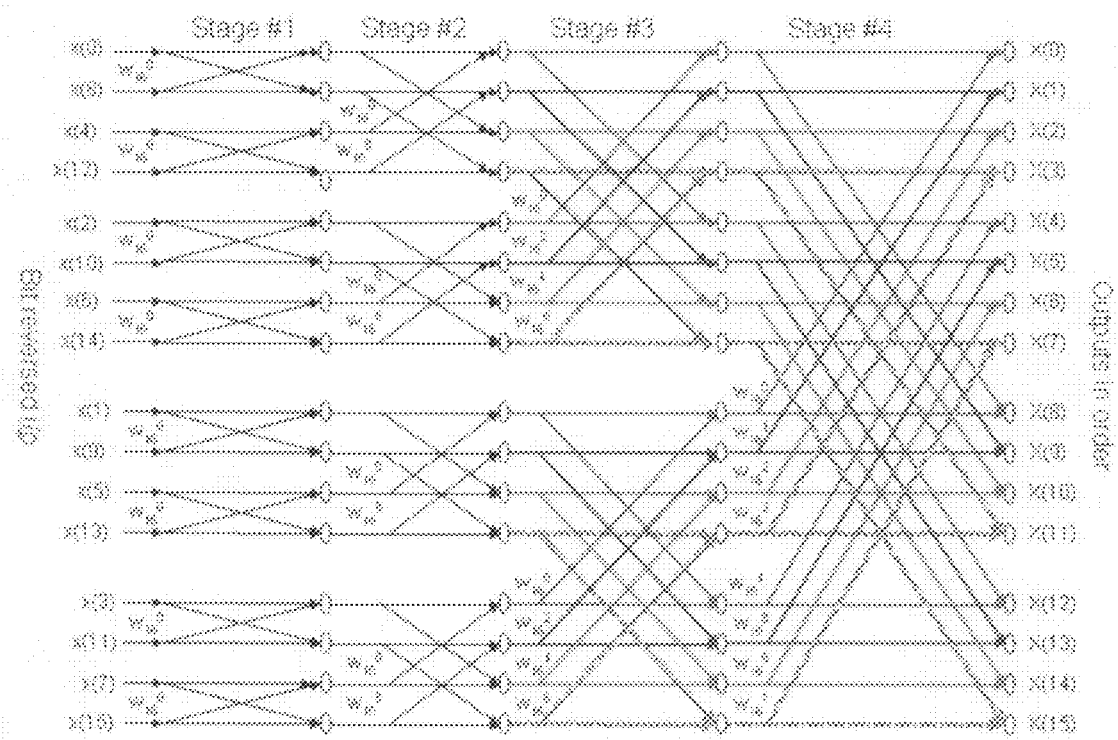
Figure 3: Butterfly distribution for 4-processor configuration N=16, P=4

METHOD AND SYSTEM FOR MULTI-PROCESSOR FFT/IFFT WITH MINIMUM INTER-PROCESSOR DATA COMMUNICATION

PRIORITY CLAIM

This application claims priority from Indian patent application No. 127/Del/2003, filed Feb. 17, 2003, which is incorporated herein by reference.

TECHNICAL FIELD

Embodiments of the present invention relate to the field of digital signal processing. More particularly, embodiments of the invention relate to a device and method for providing an FFT/IFFT implementation providing minimum inter-processor communication overhead and less silicon area in a multi-processor system.

BACKGROUND

The class of Fourier transforms that refer to signals that are discrete and periodic in nature are known as Discrete Fourier Transforms (DFT). The discrete Fourier transform (DFT) plays a key role in digital signal processing in areas such as spectral analysis, frequency domain filtering and polyphase transformations.

The DFT of a sequence of length N can be decomposed into successively smaller DFTs. The manner in which this principle is implemented falls into two classes. The first class is called a "decimation in time" approach and the second is called a "decimation in frequency" method. The first derives its name from the fact that in the process of arranging the computation into smaller transformations the sequence "x(n)" (the index 'n' is often associated with time) is decomposed into successively smaller subsequences. In the second general class the sequence of DFT coefficients "x(k)" is decomposed into smaller subsequences (k denoting frequency). Embodiments of the present invention employ "decimation in time".

Since the amount of storing and processing of data in numerical computation algorithms is proportional to the number of arithmetic operations, it is generally accepted that a meaningful measure of complexity, or of the time required to implement a computational algorithm, is the number of multiplications and additions required. The direct computation of the DFT requires "$4N^2$" real multiplications and "$N(4N-2)$" real additions. Since the amount of computation and thus the computation time is approximately proportional to "$N^2$" it is evident that the number of arithmetic operations required to compute the DFT by the direct method becomes very large for large values of "N". For this reason, computational procedures that reduce the number of multiplications and additions are of considerable interest. The Fast Fourier Transform (FFT) is an efficient algorithm for computing the DFT.

The conventional method of implementing an FFT or Inverse Fast Fourier Transform (IFFT) uses a radix-2/radix-4/mixed-radix approach with either "decimation in time (DIT)" or a "decimation in frequency (DIF)" approach.

The basic computational block is called a "butterfly"—a name derived from the appearance of flow of the computations involved in it. FIG. 1 shows a typical radix-2 butterfly computation. 1.1 represents the 2 inputs (referred to as the "odd" and "even" inputs) of the butterfly and 1.2 refers to the 2 outputs. One of the inputs (in this case the odd input) is multiplied by a complex quantity called the twiddle factor ($W_N^k$). The general equations describing the relationship between inputs and outputs are as follows:

$$X[k] = x[n] + x[n+N/2] W_N^k$$

$$X[k+N/2] = x[n] - x[n+N/2] W_N^k$$

An FFT butterfly calculation is implemented by a z-point data operation wherein "z" is referred to as the "radix". An "N" point FFT employs "N/z" butterfly units per stage (block) for "$\log_z N$" stages. The result of one butterfly stage is applied as an input to one or more subsequent butterfly stages.

Computational complexity for an N-point FFT calculation using the radix-2 approach $=O(N/2*\log_2 N)$ where "N" is the length of the transform. There are exactly "$N/2*\log_2 N$" butterfly computations, each comprising 3 complex loads, 1 complex multiply, 2 complex adds and 2 complex stores. A full radix-4 implementation on the other hand requires several complex load/store operations. Since only 1 store operation and 1 load operation are allowed per bundle of a typical VLIW processor that is normally used for such implementations, cycles are wasted in doing only load/store operations, thus reducing ILP (Instruction Level parallelism). The conventional nested loop approach requires a high looping overhead on the processor. It also makes application of standard optimization methods difficult. Due to the nature of the data dependencies of the conventional FFT/IFFT implementations, multi cluster processor configurations do not provide much benefit in terms of computational cycles. While the complex calculations are reduced in number, the time taken on a normal processor can still be quite large. It is therefore necessary in many applications requiring high-speed or real-time response to resort to multiprocessing in order to reduce the overall computation time. For efficient operation, it is desirable to have the computation as linearly scalable as possible—in other words the computation time reducing in inverse proportion to the number of processors in the multiprocessing solution. Current multiprocessing implementations of FFT/IFFT however, do not provide such a linear scalability.

U.S. Pat. No. 6,366,936 describes a multiprocessor approach for efficient FFT. The approach defined is a pipelined process wherein each processor is dependent on the output of the preceding processor in order to perform its share of work. The increase in throughput does not scale proportionately to the number of processors employed in the operation.

U.S. Pat. No. 5,293,330 describes a pipelined processor for mixed size FFT. Here too, the approach does not provide proportional scalability in throughput, as it is pipelined.

A scheme for parallel FFT/IFFT as described in "Parallel 1-D FFT Implementation with TMS320C4x DSPs" by the semiconductor group-Texas Instruments, uses butterflies that are distributed between two processors. In this implementation, inter processor communication is required because subsequent computations on one processor depend on intermediate results from other processors. Every processor computes a butterfly operation on each of the butterfly pairs allocated to it and then sends half of its computed result to the processor that needs it for the next computation step and then waits for the information of the same length from another node to arrive before continuing computations. This interdependence of processors for a single butterfly computation does not support proportionate increase in output with increase in the number of processors.

Our co-pending application no. 1208/D/02 describes a linearly scalable FFT/IFFT system. The system incorporates a shared memory wherein each processor accesses correct data samples from the shared memory. Distribution is such that no inter-processor communication is required during the butterfly computation. However there is a requirement of inter-processor communication between stages.

Though a shared memory system is easier it is not very economical. This is because this approach requires multi port memories that are very expensive. Therefore a distributed memory system is more economical. The distributed memory architecture requires a media to communicate data among the processors. Hence it is desirable that the data communication among the processors in distributed memory architecture is minimum. Since the input data is distributed in equal size segments to each processor and each processor performs computations only on the data in its local memory, the memory requirement for individual processor reduces resulting in a lower requirement for silicon area and cost.

SUMMARY

An embodiment of the present invention is to overcome the above drawbacks and provide a device and method for implementing FFT/IFFT with minimum communication overhead among processors in a multiprocessor system using distributed memory.

According to an embodiment of the invention, a scalable method for implementing FFT/IFFT computations in multi-processor architectures that provides improved throughput by eliminating the need for inter-processor communication after the computation of the first "log2P" stages for an implementation using "P" processing elements, comprises the steps of:

computing each butterfly of the first "log2P" stages on either a single processor or each of the "P" processors simultaneously, distributing the computation of the butterflies in all the subsequent stages among the "P" processors such that each chain of cascaded butterflies consisting of those butterflies that have inputs and outputs connected together, are processed by the same processor.

The distributing of the computation of the butterflies subsequent to the first "$\log_2 P$" butterflies is achieved by assigning operand addresses of each set of butterfly operands to each processor in such a manner that the butterfly is processed by the same processor that computed the connected butterfly of the previous stage in the same chain of butterflies.

The desired assignment of operand addresses is achieved by deriving the address of the first operand in the operand pair corresponding to the "$i^{th}$" stage of the computation from the address of the corresponding operand in the previous stage by inserting a "0" in the "$(i+1)^{th}$" bit position of the address, while the address of the second operand is derived by inserting a "1" in the "$(i+1)^{th}$" bit position of the operand address.

The above method further includes computing of twiddle factors for the butterfly computations at each processor by initializing a counter and then incrementing it by a value corresponding to the number of processors "P" and appending the result with a specified number of "0"s.

Another embodiment of the present invention provides a system for obtaining scalable implementation of FFT/IFFT computations in multiprocessor architectures that provides improved throughput by eliminating the need for inter-processor communication after the computation of the first "log2P" stages for an implementation using "P" processing elements, comprising:

a means for computing each butterfly of the first "log2P" stages on either a single processor or each of the "P" processors simultaneously, an addressing means for distributing the computation of the butterflies in all the subsequent stages among the "P" processors such that each chain of cascaded butterflies consisting of those butterflies that have inputs and outputs connected together, are processed by the same processor.

According to one aspect embodiment of the present invention, the addressing means comprises addresses generation means for deriving the operand addresses of the butterflies subsequent to the first "log2P" butterflies in such a manner that the butterfly is processed by the same processor that computed the connected butterfly of the previous stage in the same chain of butterflies.

According to one embodiment of the present invention, the address generation means is a computing mechanism for deriving the address of the first operand in the operand pair corresponding to the "$i^{th}$" stage of the computation from the address of the corresponding operand in the previous stage by inserting a "0" in the "$(i+1)^{th}$" bit position of the address, and deriving the address of the second operand by inserting a "1" in the "$(i+1)^{th}$" bit position of the operand address.

The above system further includes a computing mechanism for address generation of twiddle factors for each butterfly on the corresponding processor according to a further embodiment of the present invention.

BRIEF DESCRIPTION OF THE DRAWINGS

Embodiments of the present invention will now be explained with reference to the accompanying drawings, which are given only by way of illustration and are not limiting for the present invention.

FIG. 1 shows the basic structure of the signal flow in a radix-2 butterfly computation for a discrete Fourier transform.

FIG. 2 shows a 2-processor implementation of butterflies for a 16-point FFT, in accordance with an embodiment of the present invention.

FIG. 3 shows a 4-processor implementation of butterflies for a 16-point FFT, in accordance with an embodiment of the present invention.

DETAILED DESCRIPTION

Figure 4:
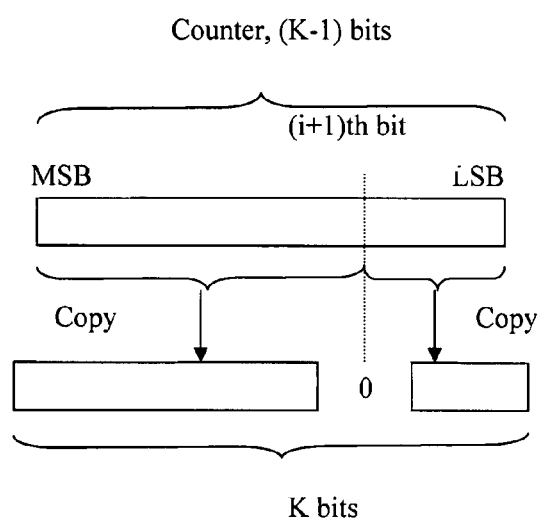
FIG. 4 is a functional diagram illustrating the address generation for a first input to a butterfly according to an embodiment of the present invention.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

FIG. 1 has already been described in the background of the invention.

FIG. 2 shows the implementation for a 16 point FFT in a 2-processor architecture using an embodiment of the present invention. Dark lines are computed in one processor, and light lines in the other. The computational blocks are represented by '0'. The left side of each computational block is its input (the time domain samples) while the right side is its output (transformed samples). Embodiments of the present invention use a mixed radix approach with decimation in time. The first two stages of the radix-2 FFT/IFFT are computed as a single radix-4 stage. As these stages contain only load/stores and add/subtract operations there is no need for multiplication. This leads to reduced time for FFT/IFFT computation as compared to that with full radix-2 implementation. The next stages have been implemented as radix-2. The three main nested loops of conventional implementations have been fused into a single loop which iterates "N/2*($\log_2$ N−2))/(number of processor)" times. Each processor is used to compute one butterfly in one loop iteration. Since there is no data dependency between different butterflies in this algorithm, both during and between stages, the computational load can be equally divided among the different processors, leading to a nearly linear scalable system. There is no data dependency between stages and therefore each processor is able to perform the butterfly computations on the data assigned to it without communicating with the other processors.

The mechanism for assigning the butterflies in this manner consists of generating the addresses of inputs such that each processor computes a complete sequence of cascaded butterflies. An N-bit counter, where "N" is the number of stages is used to derive the addresses used for variables corresponding to each butterfly stage in the computation. Two inputs are generated for the two operands of the butterfly. Introducing '0' in a specified position of the counter generates the address for input 1. Introducing 1 in a specified position of the counter generates the address for input 2. For address generation of twiddle factors a separate counter with a specified number of bits is initialized on each processor. The counter value is then appended with a specified number of zeroes. The counter is incremented by a value corresponding to the number of processors and appended with a specified number of zeroes to get the twiddle factor address of the next butterfly stage.

Distribution of data samples to the other processor can be after stage 1 at the earliest. But to save on unnecessary multiplications it can also be done after stage 2. No inter-processor communication is required once data is distributed. As a result, the red line outputs need to be collected by one of the processor at the end of the computation.

The desired assignment of operand addresses may be achieved by deriving the address of the first operand in the operand pair of the butterfly corresponding to the "ith" stage of the computation from the address of the corresponding operand in the previous stage by inserting a "0" in the "(i+1)th" bit position of the address. The address of the second operand is derived by inserting a "1" in the "(i+1)th" bit position of the operand address. The computing of twiddle factors for the butterfly computations at each processor may be done by initializing a counter and then incrementing the counter by a value corresponding to the number of processors "P" and appending the result with a specified number of "0"s. This describes the algorithm for generating the input addresses for the three inputs required for computing butterfly operations, namely the addresses for data inputs and one twiddle factor address.

Figure 5:
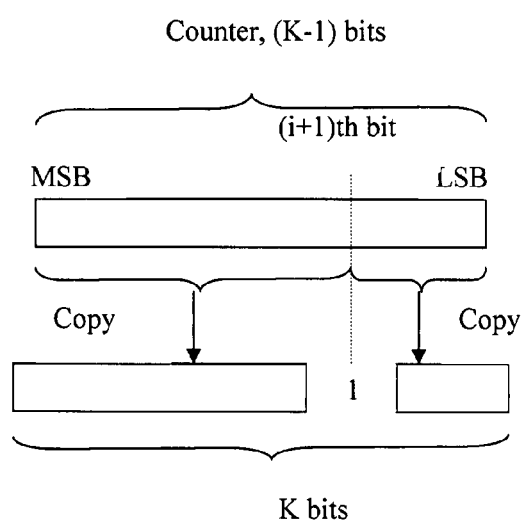
FIG. 5 is a functional diagram illustrating the address generation for the second input to the same butterfly as discussed with reference to FIG. 4 according to an embodiment of the present invention.

This address generation is illustrated diagrammatically in FIGS. 4 and 5. Let the size of the FFT/IFFT be N, the number of stages=Log2N=K, and let the current stage number be i, where i=0, 1, 2 ... (K−1). Now consider a sequential counter of (K−1) bits as illustrated in FIGS. 4 and 5. At every stage, this counter counts up to (N/2−1), starting from zero. For generating addresses of inputs to the butterfly in a stage i, the address for the first input #1 is generated by introducing a '0' in the (i+1)th position from the LSB of the counter as shown in FIG. 4. Similarly, the address for the second input #2 is generated by introducing a '1' in the (i+1)th position from LSB of the counter as shown in FIG. 5.

For generating the address of the twiddle factor in a stage 'i' a separate counter is used with the number of bits equal to (i+2) on each processor j, where j=1) with P being the number of processors in the system. In each processor j, the counter is initialized with the value j and {(K−1) (i+2)} zeroes are appended to the counter value to get the twiddle factor address. The counter is then incremented by P and appended with {(K−1) (i+2)} zeroes to get the twiddle factor address of the next butterfly in stage.

Figure 6:
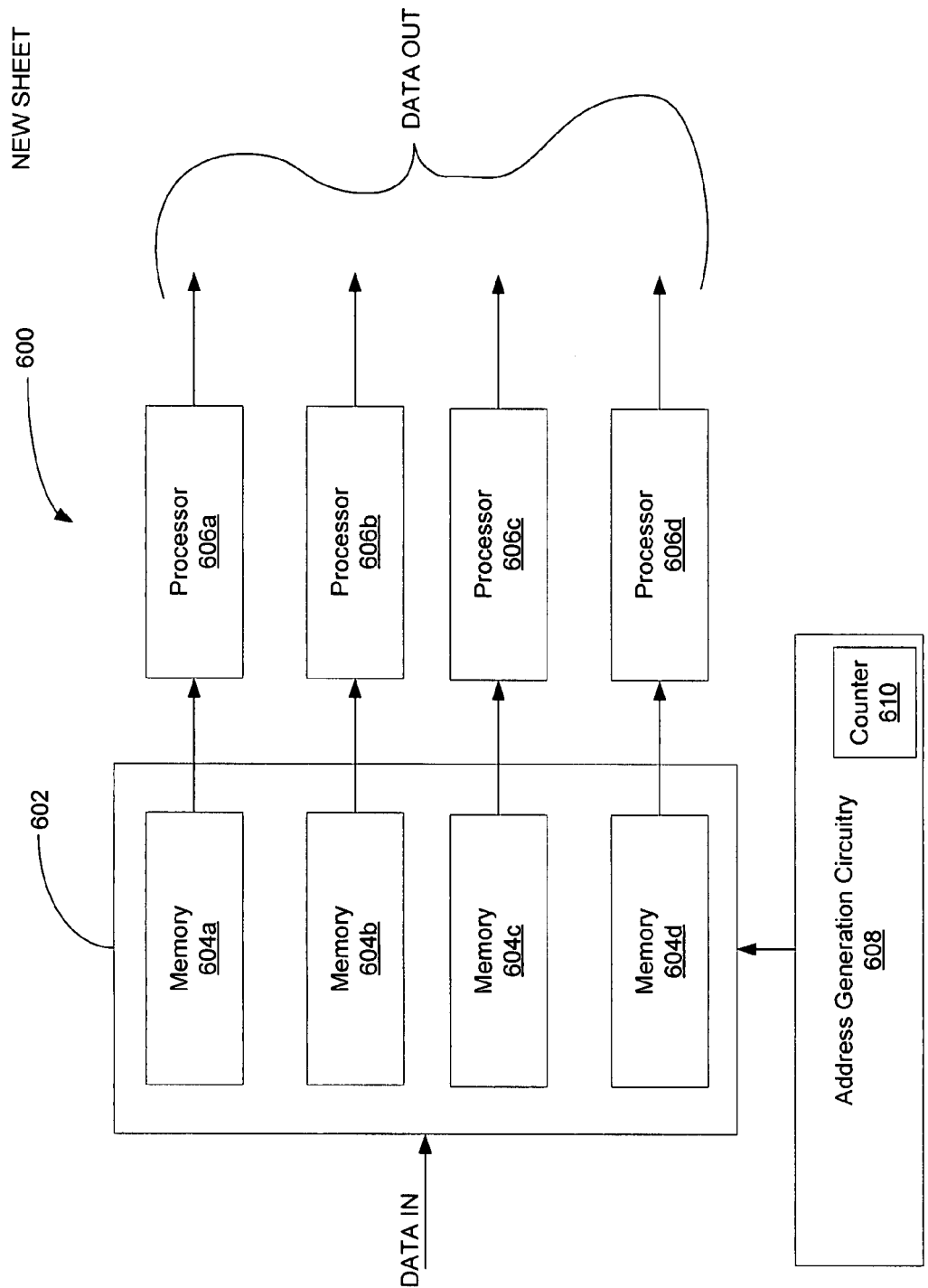
FIG. 6 is a functional block diagram illustrating a multi-processor system according to one embodiment of the present invention.

FIG. 3 shows a 4-processor implementation for the 16-point FFT according to an embodiment of the present invention. Different line colors or characteristics represent computations in each of the 4 processors. FIG. 6 is a functional block diagram illustrating a multiprocessor system 600 for implementing the 16-point FFT of FIG. 3 according to one embodiment of the present invention. Input data DATA IN to be transformed is input to a memory system 602 including four memories 604a-d, each memory storing data for a corresponding processor 606a-d. An address generation circuitry 608 address circuitry distributes the computation of the butterfly computational blocks in all stages subsequent to the first log2P states among the plurality of processors 606 such that each chain of cascaded butterfly computational blocks in the transform are coupled in series and are computed by the same processor. The address generation circuitry 608 derives the address of the first operand in an operand pair corresponding to the "ith" stage of the computation from the address of the corresponding operand in the previous stage by inserting a "0" in the "(i+1)th" bit position of the address, and derives the address of the second operand by inserting a "1" in the "(i+1)th" bit position of the operand address. The address generation circuitry 608 computes twiddle factors for the butterfly computations in each processor P by initializing a counter 610 and then incrementing this counter by a value corresponding to the number of processors 606 and appending the result with a specified number of "0"s.

In the present embodiments of the invention each processor comprises one or more ALUs (Arithmetic Logic unit), multiplier units, data cache, and load/store units. Each processor has an individual memory and the distribution of butterflies is such that there is no inter-processor communication required after the distribution of data. The distribution of data takes place after "$\log_2 P$" stages where "P" is the number of processors. Inter-processor communication takes place only before and after all the computations have been completed. The amount of data communication overhead does not increase with an increase in the number of processors.

The embodiments of the invention, though described for distributed memory can be applied to shared memory systems also. Our co-pending application no. 1208/D/02 provides a linearly scalable system for shared memory systems only.

It will be apparent to those with ordinary skill in the art that the foregoing is merely illustrative and is not intended to be exhaustive or limiting, having been presented by way of example only and that various modifications can be made within the scope of the above embodiments of the invention.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

The described embodiments of the present invention may be utilized in a variety of different types of integrated circuits including digital signal processors and communications circuits, and such circuits may be contained in a variety of different types of electronic systems such as communications and computer systems.

According to one embodiment of the present invention, a scalable method for implementing FFT/IFFT computations in multiprocessor architectures provides improved throughput by eliminating the need for inter-processor communication after the computation of the first "log2P" stages of the FFT/IFFT computations for a multiprocessor architecture including an implementation using "P" processing elements. The method includes computing each butterfly of the first "log2P" stages on either a single processing element or on each of the "P" processing elements simultaneously and distributing the computation of the butterflies in all the subsequent stages among the "P" processors such that each chain of cascaded butterflies consisting of those butterflies that have inputs and outputs connected together, are processed by the same processor.

In one embodiment of this method the distributing of the computation of the butterflies subsequent to the first "log2P" butterflies is achieved by assigning operand addresses of each set of butterfly operands to each processor in such a manner that the butterfly is processed by the same processor that computed the connected butterfly of the previous stage in the same chain of butterflies. The desired assignment of operand addresses may be achieved by deriving the address of the first operand in the operand pair corresponding to the "$i^{th}$" stage of the computation from the address of the corresponding operand in the previous stage by inserting a "0" in the "$(i+1)^{th}$" bit position of the address, while the address of the second operand is derived by inserting a "1" in the "$(i+1)^{th}$" bit position of the operand address. This embodiment may further include the computing of twiddle factors for the butterfly computations at each processor by initializing a counter and then incrementing it by a value corresponding to the number of processors "P" and appending the result with a specified number of "0"s.

In another embodiment of the present invention, a system for obtaining scalable implementation of FFT/IFFT computations in multiprocessor architectures provides improved throughput by eliminating the need for inter-processor communication after the computation of the first "log2P" stages for an implementation using "P" processing elements. The system includes a means for computing each butterfly of the first "log2P" stages on either a single processor or each of the "P" processors simultaneously and an addressing means for distributing the computation of the butterflies in all the subsequent stages among the "P" processors such that each chain of cascaded butterflies consisting of those butterflies that have inputs and outputs connected together, are processed by the same processor.

In one embodiment the addressing means includes addresses generation means for deriving the operand addresses of the butterflies subsequent to the first "log2P" butterflies in such a manner that the butterfly is processed by the same processor that computed the connected butterfly of the previous stage in the same chain of butterflies. The address generation means may be a computing mechanism for deriving the address of the first operand in the operand pair corresponding to the "ith" stage of the computation from the address of the corresponding operand in the previous stage by inserting a "0" in the "(i+1)th" bit position of the address, and deriving the address of the second operand by inserting a "1" in the "(i+1)th" bit position of the operand address. The system may further include a computing mechanism for address generation of twiddle factors for each butterfly on the corresponding processor.

In one embodiment, a method of performing a fast Fourier transform or inverse fast Fourier transform on a plurality of inputs to generate a plurality of outputs is performed on a plurality of processors and each transform includes a plurality of stages containing at least one butterfly computational block. This embodiment may include calculating the butterfly computational blocks for the first log2(P) stages of the transform on a single one of the processors or on a plurality of the processors operating in parallel and calculating chains of butterfly computational blocks corresponding to the subsequent stages of the transform within each of the processors, each chain of butterfly computational blocks that is calculated in a respective processor having inputs and outputs coupled in series.

The first log2(P) stages of the transform may be calculated on all of the processors operating in parallel. This embodiment may be implemented on two processors, with the first two stages of a radix-2 fast Fourier transform or inverse fast Fourier transform calculated as a single radix-4 stage, and the subsequent stages of the transform are computed as radix-2 stages. The chains may comprise a single loop that iterates N/2*(log2(N/2))/(number of processors) times. Each butterfly computational block may include a plurality of operands each having an associated address. Calculating chains of butterfly computational blocks corresponding to the subsequent stages may include assigning addresses to each of the operands so that each butterfly block in a chain is calculated in the same processor. Each butterfly computational block may include a pair of operands and the operand addresses of these operands may be assigned by deriving the address of the first operand in the operand pair corresponding to the "ith" stage of the calculation in the chain from the address of the corresponding operand in the previous stage by inserting a "0" in the "(i+1)th" bit position of the operand address, and deriving the operand address of the second operand by inserting a "1" in the "(i+1)th" bit position of the operand address. This embodiment may further include initializing a counter and then incrementing the counter by a value corresponding to the number of processors and appending the result with a specified number of "0"s to compute the twiddle factors for each butterfly computational block.

According to another embodiment of the present invention, a processor system includes a plurality of processors operable to execute a fast Fourier transform or inverse fast Fourier transform algorithm on a plurality of inputs to generate a plurality of outputs, each transform including a plurality of stages containing at least one butterfly computational block, and the processors operable to the butterfly computational block for the first "log2P" stages of the transform on either a single one of the processors or on a plurality of the processors operating in parallel. Address circuitry is operable to distribute the computation of the butterfly computational blocks in all stages subsequent to the first log2P states among the plurality of processors such that each chain of cascaded butterfly computational blocks in the transform are coupled in series and are computed by the same processor.

The address circuitry may be further operable to derive operand addresses for each of the butterfly blocks subsequent to the first "log2P" butterfly blocks so that each of the butterfly computational blocks is computed by the same processor that computed a butterfly computational block of the previous stage in the same chain of butterfly computational blocks. Each butterfly computational block may include a pair of operands and the address circuitry may assign operand addresses of these operands by deriving the address of the first operand in the operand pair corresponding to the "ith" stage of the calculation in the chain from the address of the corresponding operand in the previous stage by inserting a "0" in the "(i+1)th" bit position of the operand address, and deriving the operand address of the second operand by inserting a "1" in the "(i+1)th" bit position of the operand address. The processors may further comprise a counter that is initialized and then incremented by a value corresponding to the number of processors, an output of the counter being appended with a specified number of "0"s to compute twiddle factors for each butterfly computational block. Each of the processors may include a digital signal processor. An electronic system may include this processor system where the electronic system is a communications system. Each of the processors may be a digital signal processor.

We claim:

1. A method for controlling processing elements in a multiprocessor architecture to provide improved throughout for Fast Fourier Transform/Inverse Fast Fourier Transform (FFT/IFFT) computations, the method comprising the steps of:

computing, on a multiprocessor architecture including "P" processing elements each butterfly of the first "$\log_2 P$" stages of an FFT/IFFT on either a single one of the processing elements or on each of the "P" processing elements simultaneously;

distributing the computations of the butterflies in all the subsequent stages of the FFT/IFFT among the "P" processing elements such that each chain of cascaded butterflies consisting of those butterflies that have inputs and outputs connected together is processed by the same processing element to thereby eliminate the need for inter-processor communication among the processing elements after the computation of the first "$\log 2P$" stages of the FFT/IFFT;

wherein the distributing of the computation of the butterflies subsequent to the first "$\log_2 P$" butterflies is achieved by assigning operand addresses of each set of butterfly operands to each processing element in such a manner that the butterfly is processed by the same processing element that computed the connected butterfly of the previous stage in the same chain of butterflies; and wherein the desired assignment of operand addresses is achieved by deriving the address of the first operand in the operand pair corresponding to the "$i^{th}$" stage of the computation from the address of the corresponding operand in the previous stage by inserting a "0" in the "$(i+1)^{th}$" bit position of the address, while the address of the second operand is derived by inserting a "1" in the "$(i+1)^{th}$" bit position of the operand address.

2. A method for controlling processing elements in a multiprocessor architecture to provide improved throughout for Fast Fourier Transform/Inverse Fast Fourier Transform (FFT/IFFT) computations, the method comprising the steps of:

computing, on a multiprocessor architecture including "P" processing elements each butterfly of the first "$\log_2 P$" stages of an FFT/IFFT on either a single one of the processing elements or on each of the "P" processing elements simultaneously;

distributing the computations of the butterflies in all the subsequent stages of the FFT/IFFT among the "P" processing elements such that each chain of cascaded butterflies consisting of those butterflies that have inputs and outputs connected together is processed by the same processing element to thereby eliminate the need for inter-processor communication among the processing elements after the computation of the first "$\log_2 P$" stages of the FFT/IFFT; and computing twiddle factors for the butterfly computations at each processing element by initializing a counter and then incrementing it by a value corresponding to the number of processing elements "P" and appending the result with a specified number of "0"s.

3. A system for controlling processing elements in a multiprocessor architecture including "P" processing elements, comprising:

a means for computing each butterfly of the first "$\log 2P$" stages of a Fast Fourier Transform/Inverse Fast Fourier Transform (FFT/IFFT) on either a single processing element or on each of "P" processing elements simultaneously;

an addressing means for distributing the computation of the butterflies in all the subsequent stages of the FFT/IFFT among the "P" processing elements such that each chain of cascaded butterflies consisting of those butterflies that have inputs and outputs connected together is processed by the same processing element to thereby eliminate the need for inter-processor communication among the processing elements after the computation of the first "$\log 2P$" stages of the FFT/IFFT;

a means for counting; and a means for computing twiddle factors for the butterfly computations at each processing element, the means for computing initializing the means for counting and then incrementing the means for counting by a value corresponding to the number of processing elements "P" and appending the result with a specified number of "0"s.

4. A system as claimed in claim 3 wherein the addressing means comprises addresses generation means for deriving the operand addresses of the butterflies subsequent to the first "$\log 2P$" butterflies in such a manner that the butterfly is processed by the same processing element that computed the connected butterfly of the previous stage in the same chain of butterflies.

5. A system as claimed in claim 4 wherein the address generation means is a computing mechanism for deriving the address of the first operand in the operand pair corresponding to the "$i^{th}$" stage of the computation from the address of the corresponding operand in the previous stage by inserting a "0" in the "$(i+1)^{th}$" bit position of the address, and deriving the address of the second operand by inserting a "1" in the "$(i+1)^{th}$" bit position of the operand address.

6. A system as claimed in claim 3 further including a computing mechanism for address generation of twiddle factors for each butterfly on the corresponding processing element.

7. A method of performing a Fast Fourier Transform or Inverse Fast Fourier Transform on an input signal, the method comprising:

storing samples of the input signal in a memory;

retrieving the samples from the memory and from these retrieved samples calculating the butterfly computational blocks for the first "$\log_2 P$" stages of the transform on a single processor or on a plurality of processors operating in parallel; and eliminating the need for communication among and between the processors after the computation of the first "$\log_2 P$" stages of the transform by calculating chains of butterfly computational blocks corresponding to the subsequent stages of the transform within each of the processors, each chain of butterfly computational blocks calculated in a respective processor having inputs and outputs coupled in series;

wherein the first "$\log_2 P$" stages of the transform are calculated on all of the processors operating in parallel;

wherein the method is performed on two processors, and wherein the first two stages of a radix-2 Fast Fourier Transform or Inverse Fast Fourier Transform are calculated as a single radix-4 stage, and wherein the subsequent stages of the transform are computed as radix-2 stages;

wherein chains comprise a single loon that iterates $N/2 * (\log_2(N/2))/$(number of processors) times;

wherein each butterfly computational block includes a plurality of operands each having an associated address, and wherein calculating chains of butterfly computational blocks corresponding to the subsequent stages comprises assigning addresses to each of the operands so that each butterfly block in a chain is calculated in the same processor; and wherein each butterfly computational block includes a pair of operands, and wherein the operand addresses of these operands are assigned by deriving the address of the first operand in the operand pair corresponding to the "$i^{th}$" stage of the calculation in the chain from the address of the corresponding operand in the previous stage by inserting a "0" in the "$(i+1)^{th}$" bit position of the operand address, and deriving the operand address of the second operand by inserting a "1" in the "$(i+1)^{th}$" bit position of the operand address.

8. A method of performing a Fast Fourier Transform or Inverse Fast Fourier Transform on an input signal, the method comprising:

storing samples of the input signal in a memory;

retrieving the samples from the memory and from these retrieved samples calculating the butterfly computational blocks for the first "$\log_2 P$" stages of the transform on a single processor or on a plurality of processors operating in parallel;

eliminating the need for communication among and between the processors after the computation of the first "$\log_2 P$" stages of the transform by calculating chains of butterfly computational blocks corresponding to the subsequent stages of the transform within each of the processors, each chain of butterfly computational blocks calculated in a respective processor having inputs and outputs coupled in series; and initializing a counter and then incrementing the counter by a value corresponding to the number of processors and appending the result with a specified number of "0"s to compute the twiddle factors for each butterfly computational block.

9. The method of claim 8 wherein the first "$\log_2 P$" stages of the transform are calculated on all of the processors operating in parallel.

10. The method of claim 8 wherein the method is performed on two processors, and wherein the first two stages of a radix-2 Fast Fourier Transform or Inverse Fast Fourier Transform are calculated as a single radix-4 stage, and wherein the subsequent stages of the transform are computed as radix-2 stages.

11. The method of claim 10 wherein chains comprise a single loop that iterates $N/2 * (\log_2(N/2))/$(number of processors) times.

12. The method of claim 11 wherein each butterfly computational block includes a plurality of operands each having an associated address, and wherein calculating chains of butterfly computational blocks corresponding to the subsequent stages comprises assigning addresses to each of the operands so that each butterfly block in a chain is calculated in the same processor.

13. A processor system, comprising:

a memory operable to store samples of an input signal;

a plurality of processors coupled to the memory, the plurality of processors operable to receive the samples from the memory and to use the samples to execute the butterfly computational blocks for the first "$\log_2 P$" stages of a Fast Fourier Transform or Inverse Fast Fourier Transform on either a single one of the processors or on a plurality of the processors operating in parallel; and address circuitry coupled to the memory and processor and operable to distribute the computation of the butterfly computational blocks in all stages subsequent to the first "$\log_2 P$" stages among the plurality of processors such that each chain of cascaded butterfly computational blocks in the transform is coupled in series and is computed by the same processor to thereby eliminate the need for communication among and between the processors after the computation of the first "log2P" stages of the transform;

wherein the address circuitry is further operable to derive operand addresses for each of the butterfly blocks subsequent to the first "$\log_2 P$" butterfly blocks so that each of the butterfly computational blocks is computed by the same processor that computed a butterfly computational block of the previous stage in the same chain of butterfly computational blocks; and wherein each butterfly computational block includes a pair of operands, and wherein the address circuitry assigns operand addresses of these operands by deriving the address of the first operand in the operand pair corresponding to the "$i^{th}$" stage of the calculation in the chain from the address of the corresponding operand in the previous stage by inserting a "0" in the "$(i+1)^{th}$" bit position of the operand address, and deriving the operand address of the second operand by inserting a "1" in the "$(i+1)^{th}$" bit position of the operand address.

14. A processor system, comprising:

a memory operable to store samples of an input signal;

a plurality of processors coupled to the memory, the plurality of processors operable to receive the samples from the memory and to use the samples to execute the butterfly computational blocks for the first "$\log_2 P$" stages of a Fast Fourier Transform or Inverse Fast Fourier Transform on either a single one of the processors or on a plurality of the processors operating in parallel;

address circuitry coupled to the memory and processor and operable to distribute the computation of the butterfly computational blocks in all stages subsequent to the first "$\log_2 P$" stages among the plurality of processors such that each chain of cascaded butterfly computational blocks in the transform is coupled in series and is computed by the same processor to thereby eliminate the need for communication among and between the processors after the computation of the first "$\log_2 P$" stages of the transform;

wherein the address circuitry is further operable to derive operand addresses for each of the butterfly blocks subsequent to the first "$\log_2 P$" butterfly blocks so that each of the butterfly computational blocks is computed by the same processor that computed a butterfly computational block of the previous stage in the same chain of butterfly computational blocks; and wherein the processors further comprise a counter that is initialized and then incremented by a value corresponding to the number of processors, an output of the counter being appended with a specified number of "0"s to compute twiddle factors for each butterfly computational block.

15. The processor system of claim 14 wherein each of the processors comprises a digital signal processor.

16. An electronic system, comprising:
a processor system, including,
   a memory operable to store samples of an input signal;
   a plurality of processors coupled to the memory, the plurality of processors operable to receive samples from the memory and to use the samples to execute the butterfly computational blocks for the first "$\log_2 P$" stages of a Fast Fourier Transform or Inverse Fast Fourier Transform on either a single one of the processors or on a plurality of the processors operating in parallel; and
   address circuitry coupled to the memory and processor and operable to distribute the computation of the butterfly computational blocks in all stages subsequent to the first "$\log_2 P$" stages among the plurality of processors such that each chain of cascaded butterfly computational blocks in the transform is coupled in series and is computed by the same processor to thereby eliminate the need for communication among and between the processors after the computation of the first "$\log_2 P$" stages of the transform;
   wherein the address circuitry is further operable to derive operand addresses for each of the butterfly blocks subsequent to the first "$\log_2 P$" butterfly blocks so that each of the butterfly computational blocks is computed by the same processor that computed a butterfly computational block of the previous stage in the same chain of butterfly computational blocks; and
   wherein the processors further comprise a counter that is initialized and then incremented by a value corresponding to the number of processors, an output of the counter being appended with a specified number of "0"s to compute twiddle factors for each butterfly computational block.

17. The electronic system of claim 16 wherein the electronic system comprises a communications system.

18. The electronic system of claim 16 wherein each of the processors comprises a digital signal processor.

* * * * *